United States Patent
Lukkarila et al.

(10) Patent No.: US 8,539,610 B2
(45) Date of Patent: Sep. 17, 2013

(54) SOFTWARE SECURITY

(75) Inventors: Jari Juhani Lukkarila, Tampere (FI); Rauno Juhani Tamminen, Tampere (FI)

(73) Assignee: Nokia Corporation, Espoo (FI)

( * ) Notice: Subject to any disclaimer, the term of this patent is extended or adjusted under 35 U.S.C. 154(b) by 299 days.

(21) Appl. No.: 12/915,551

(22) Filed: Oct. 29, 2010

(65) Prior Publication Data
US 2012/0110333 A1    May 3, 2012

(51) Int. Cl.
*G06F 7/04* (2006.01)
(52) U.S. Cl.
USPC ........... 726/30; 713/171; 713/176; 713/193; 380/30; 380/277; 380/278
(58) Field of Classification Search
USPC ........... 713/176, 193, 171; 380/30, 277–278; 726/30
See application file for complete search history.

(56) References Cited

U.S. PATENT DOCUMENTS

| | | | | |
|---|---|---|---|---|
| 7,587,600 | B2 * | 9/2009 | Bodensjo et al. | 713/176 |
| 8,165,302 | B2 * | 4/2012 | Pedlow, Jr. | 380/277 |
| 2002/0090091 | A1 | 7/2002 | Ng et al. | |
| 2004/0218763 | A1 * | 11/2004 | Rose et al. | 380/277 |
| 2007/0277038 | A1 | 11/2007 | Hardy et al. | |
| 2008/0010470 | A1 | 1/2008 | McKeon et al. | |
| 2009/0086974 | A1 | 4/2009 | Murase et al. | |

FOREIGN PATENT DOCUMENTS

| | | |
|---|---|---|
| EP | 1659472 | 5/2006 |
| GB | 2355819 | 5/2001 |
| GB | 2 425 193 A | 10/2006 |

OTHER PUBLICATIONS

International Search Report of International App. No. PCT/FI2011/050851—Date of Completion of Search: Jan. 18, 2012, 6 pages.
Written Opinion of the International Searching Authority of International App. No. PCT/FI2011/050851—Date of Completion of Opinion: Jan. 18, 2012, 8 pages.
Suh, G., et al., "Aegis: A Single-Chip Secure Processor", IEEE Design & Test of Computers, 2007, pp. 570-580.

* cited by examiner

*Primary Examiner* — Thanhnga B Truong
(74) *Attorney, Agent, or Firm* — Locke Lord LLP

(57) ABSTRACT

An apparatus with at least one secure memory area comprising a plurality of pre-installed public keys for verifying software authenticity. The apparatus is caused to receive an indication that a software package signed with a private key according to public key infrastructure has been received; check from the secure memory area, whether a public key associated with the private key with which the software package has been signed, is disabled; and if the public key associated with the private key is disabled, prevent execution of the received software package, and otherwise, proceed to verify authenticity of the received software package using the public key associated with the private key.

13 Claims, 4 Drawing Sheets

SOFTWARE SECURITY

TECHNICAL FIELD

The present invention generally relates to software security. The invention relates particularly, though not exclusively, to software revocation and updating and software signing.

BACKGROUND ART

Software signing is a widely used method for ensuring that an electronic device runs only code that it is intended to and that code has been provided by a trusted party. Having control over which software runs on an electronic device is important for several reasons: safety of the device, privacy of the consumer, brand protection, certification of the device, complying with legislation authorities, protecting the software asset of the device, enabling application and service business etc. Losing control over executable software can have serious impacts both to consumers and to device manufacturers.

Public key cryptography (PKI) is a method that can be used for signing software and verifying authenticity of the software. PKI uses a key pair comprising a public key and a private key. The private key is used for signing software and shall only be known to the entity that controls which software will be allowed to be executed in a particular device. This entity may be the device manufacturer, for example. The public key shall be stored on the device and the device is configured to use the public key for performing a cryptographic check to new software before allowing it to be executed in the device.

SUMMARY

According to a first example aspect of the invention there is provided an apparatus comprising
 at least one secure memory area comprising a plurality of pre-installed public keys for verifying software authenticity;
 at least one processor; and
 at least one memory including computer program code, the at least one memory and the computer program code being configured to, with the at least one processor, cause the apparatus at least to:
  receive an indication that a software package signed with a private key according to public key infrastructure has been received;
  check from the secure memory area, whether a public key associated with the private key with which the software package has been signed, is disabled; and
  if the public key associated with the private key is disabled, prevent execution of the received software package, and otherwise, proceed to verify authenticity of the received software package using the public key associated with the private key.

According to a second example aspect of the invention there is provided a method comprising:
 maintaining a secure memory area comprising a plurality of pre-installed public keys for verifying software authenticity;
 receiving an indication that a software package signed with a private key according to public key infrastructure has been received;
 checking from the secure memory area, whether a public key associated with the private key with which the software package has been signed, is disabled; and
 if the public key associated with the private key is disabled, preventing execution of the received software package, and otherwise, proceeding to verify authenticity of the received software package using the public key associated with the private key.

According to a third example aspect of the invention there is provided a method comprising:
 obtaining a plurality of public-private key pairs,
 pre-installing the plurality of public keys of the public-private key pairs into a secure memory area of an electronic apparatus for the purpose of being used for verifying authenticity of a software to be run in the electronic apparatus, and
 storing the plurality of private keys of the public-private key pairs in a separate place for the purpose of being used for signing software, which is to be run in the electronic apparatus.

According to a fourth example aspect of the invention there is provided a computer program embodied on a computer readable medium comprising computer executable program code which, when executed by at least one processor of an apparatus, which comprises at least one secure memory area comprising a plurality of pre-installed public keys for verifying software authenticity, causes the apparatus to:
 receive an indication that a software package signed with a private key according to public key infrastructure has been received;
 check from the secure memory area, whether a public key associated with the private key with which the software package has been signed, is disabled; and
 if the public key associated with the private key is disabled, prevent execution of the received software package, and otherwise, proceed to verify authenticity of the received software package using the public key associated with the private key.

According to a fifth example aspect of the invention there is provided an apparatus comprising:
 memory means comprising a plurality of pre-installed public keys for verifying software authenticity;
 means for receiving an indication that a software package signed with a private key according to public key infrastructure has been received
 means for checking from the secure memory area, whether a public key associated with the private key with which the software package has been signed, is disabled; and
 means configured to prevent execution of the received software package, if the public key associated with the private key is disabled, and otherwise, to proceed to verify authenticity of the received software package using the public key associated with the private key.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

A common security threat to an electronic device, like a mobile phone, is a bug contained in the device's own software. A malicious hacker may be able to exploit the bug and gain control over desired functions, like subsidy lock. In research and development phase of an electronic device numerous software revisions possibly containing bugs that may have security implications are created and signed for the target electronic device. The normal work flow may include number of phases of implementing, testing and fixing the device software as part of the process of maturating the device to be ready for consumer markets.

Since the research and development versions of the software that possibly containing security threatening bugs can be executed on the target device, they may present a security threat if they would ever leak out into the public. A possible way of handling this is to change the public-private key pair that is used for software signing when the device is ready to enter consumer markets. This means that the public part of the key pair stored in the device hardware needs to be changed. Each device sold to consumers has a different key from the key that is used in the early research and development phase. This way any software image signed with the research and development phase keys shall not run on a device sold to a customer.

The public key is permanently programmed into device hardware and therefore changing the key has meant manufacturing new devices. The party that controls the private keys has been forced to generate a new private/public key pair and obtain new hardware parts containing the new public key. New hardware parts must have been ordered from an external chipset vendor, for example. Thereafter the new parts have been delivered to device production line for assembling new devices and the software signing scheme has been changed to use the new key and all previously generated software packages will not run in the new device hardware. In other words changing the keys to be used may be a laborious task consuming resources, money and creating a logistical burden on both chipset and device manufacturer.

An example embodiment of the invention now provides new type of public key management for software signing.

An example embodiment of the invention introduces injection of several public keys into device hardware at once. In a further example embodiment an index based management is created to control the usage of public keys.

An apparatus according to an example embodiment of the invention comprises a plurality of pre-installed public keys instead of containing only one public key. The plurality of public keys may be stored in a secure memory area. Some of the pre-installed keys may be disabled from further use.

Figure 1:
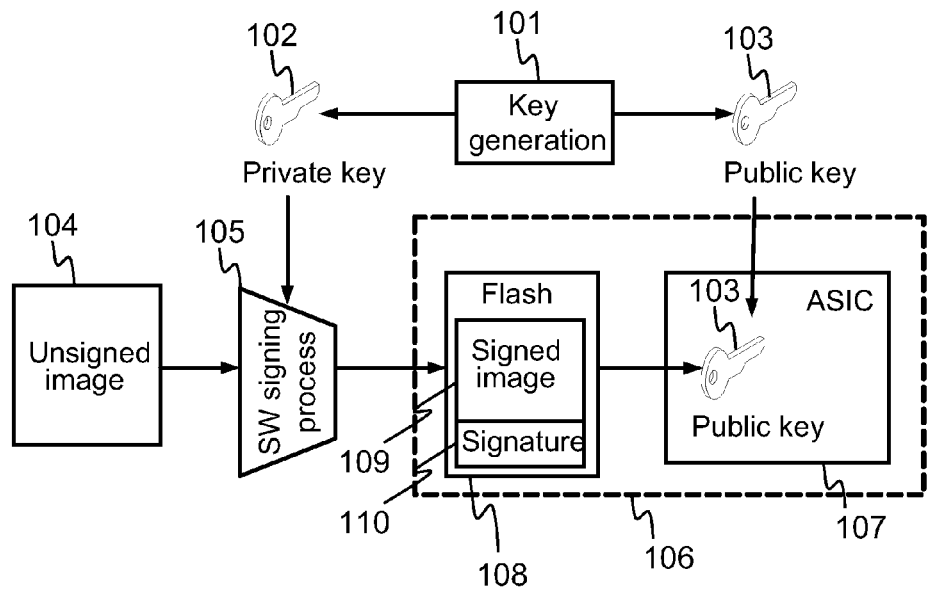
FIG. 1 illustrates software signing process in general.

FIG. 1 illustrates software signing process in general for an apparatus 106. The apparatus comprises processing hardware 107 (application specific integrated circuit, ASIC) and a flash memory 108.

A public-private key pair is generated in block 101. Resulting private key 102 shall be kept confidential and shall be available for authorized software manufacturer only. Resulting public key 103 is stored in the apparatus 106 in hardware 107. The public key may be embedded in one-time-programmable memory (OTP) of the hardware 107.

A software image 104 is signed in block 105 with the private key 102 to obtain a signed software image (or software package) 109. The signed software image 109 and associated signature 110 are provided to the flash memory 108 of the apparatus 106. The hardware 107 of the apparatus 106 then verifies the signature 110 against the public key 103 embedded in the hardware 107. In this scenario changing the key pair in the signing scheme essentially means that a new apparatus with new hardware is needed since the public key 103 is embedded inside the apparatus 106.

Figure 2:
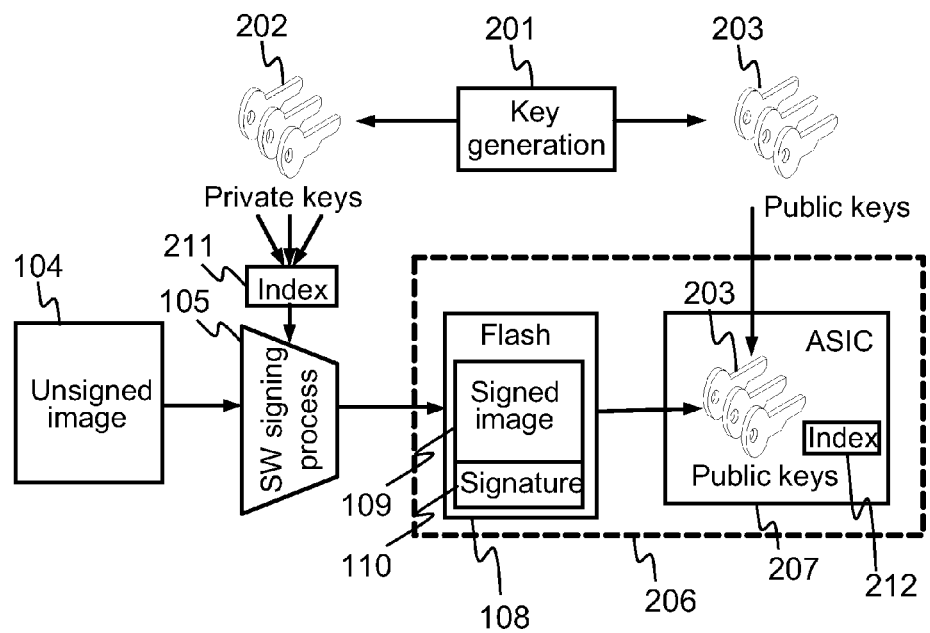
FIG. 2 illustrates software signing process according to an example embodiment of the invention.

FIG. 2 illustrates software signing process according to an example embodiment of the invention for an apparatus 206. The apparatus comprises processing hardware 207 (application specific integrated circuit, ASIC) and a flash memory 108.

Several public-private key pairs are generated in block 201. Resulting private keys 202 shall be kept confidential and shall be available for authorized software manufacturer only. Resulting public keys 203 are stored in the apparatus 206 in hardware 207. The public keys 203 may be embedded in one-time-programmable memory (OTP) of the hardware 207. The private keys 202 and the public keys 203 may be provided with associated indexes 211 and 212, respectively.

A software image 104 is signed in block 205 with currently active private key of the several private keys 202 to obtain a signed software image (or software package) 109. The signed software image 109 and associated signature 110 are provided to the flash memory 108 of the apparatus 206. The hardware 207 of the apparatus 206 then confirms that a valid public-private key pair is in use and then verifies the signature 110 against the currently active public key of the several public keys 203 embedded in the hardware 207. In this scenario changing the key pair in the signing scheme involves disabling previously used key pair and taking a new key pair into use and the exact same apparatus 206 may be used after the key change. The indexes 211 and 212 may be used for disabling and changing the key pairs.

Figure 3:
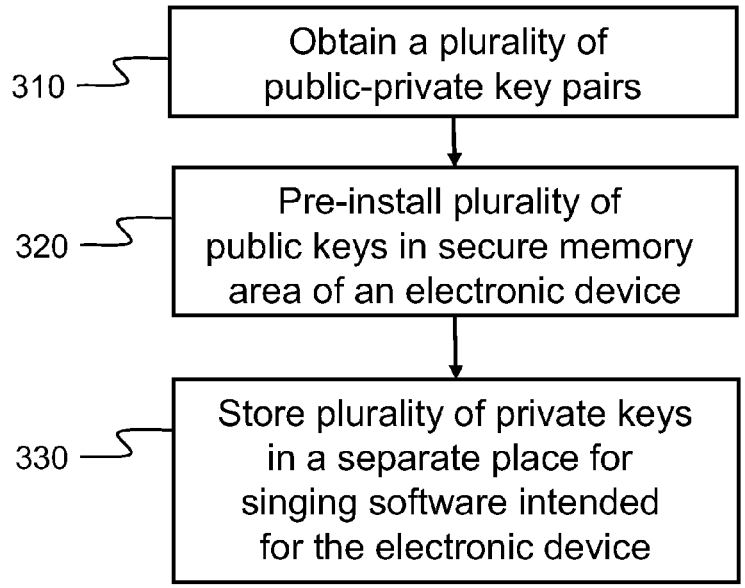
FIG. 3 is a flow diagram illustrating a method according to an example embodiment of the invention.

FIG. 3 is a flow diagram illustrating another method according to an example embodiment of the invention. The method concerns manufacturing an electronic apparatus. The electronic apparatus may be for example an application specific integrated circuit or some other hardware component.

In phase 310, a plurality of public-private key pairs are obtained. The keys may be generated or they may be obtained from some suitable source. The keys may have been generated beforehand, for example.

In phase 320, the plurality of public keys of the public-private key pairs are pre-installed into an electronic apparatus for the purpose of being used for verifying authenticity of a software to be run in the electronic apparatus. The public keys may be stored in a secure memory area of the electronic apparatus.

In phase 330, the plurality of private keys of the public-private key pairs are stored in a separate place for the purpose of being used for signing software intended for the electronic apparatus.

In an example embodiment of the invention an index table that maps the public and private keys to index numbers is set up for the public-private key pairs. The index numbers may then be used for controlling which public-private key pair is in use and for confirming validity of used key pair according to various embodiments of the invention as described elsewhere in this document.

Figure 4A:
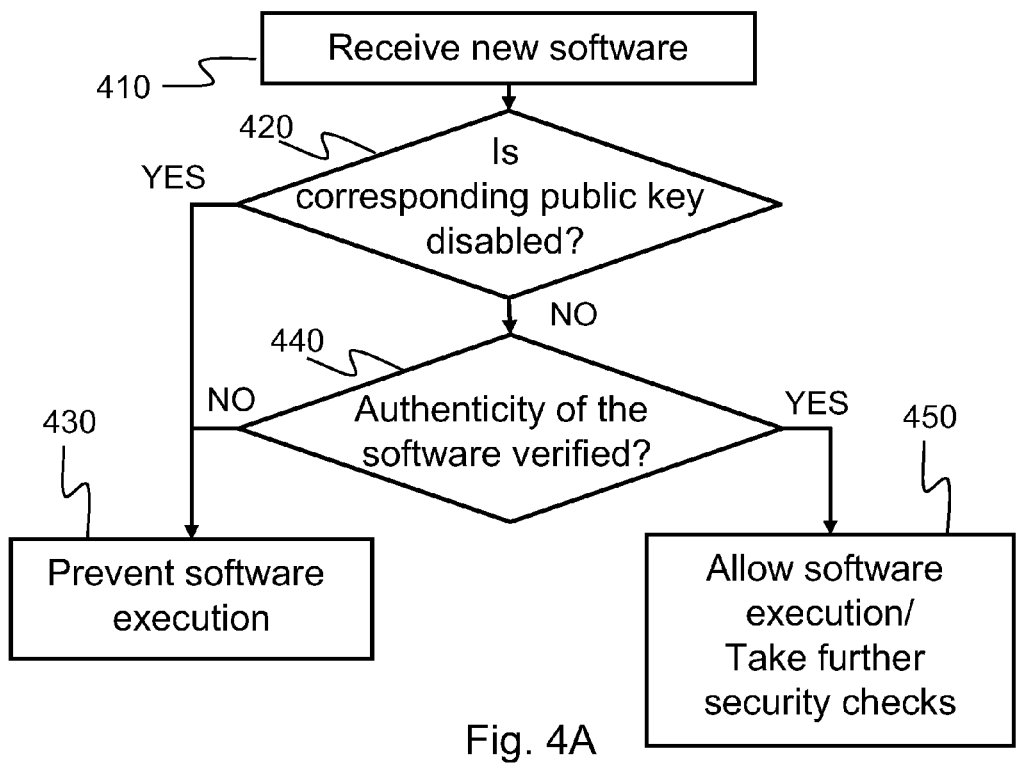
FIG. 4A is a flow diagram illustrating another method according to an example embodiment of the invention.

FIG. 4A is a flow diagram illustrating a method according to an example embodiment of the invention. The method may be implemented for example in apparatus 206 of FIG. 2.

In phase 410, a software package signed with a private key is received. In phase 420 a check is made, whether a public key associated with the private key with which the software package has been signed, is disabled. If the public key associated with the private key is disabled, execution of the received software package is prevented in phase 430. Otherwise the process proceeds to phase 440 to verify authenticity of the received software package using the public key associated with the private key. If authenticity is not confirmed, the process proceeds to phase 430 and execution of the received software package is prevented. Otherwise execution of the software is allowed in phase 450 and/or further security measures are taken.

In an example embodiment of the invention the plurality of pre-installed public keys have associated public key index numbers and the secure memory area comprises current public key index number indicating currently used public key. Then a private key index number is received with the received software package and the received private key index number and the stored current public key index number are compared. If the received private key index number is equal to the current public key index number, the process proceeds to verify authenticity of the received software package using the public key associated with the private key. If the received private key index number is different from the current public key index number, further checks may be made.

In an example embodiment of the invention the process continues as follows: If the received private key index number matches a public key index number that is disabled, execution of the received software package is prevented. Otherwise, the process proceeds to verify authenticity of the received software package using the public key associated with the private key. In an example embodiment of the invention the received private key index number is stored as the current public key index number and thereby the private-public key pair is updated to a new one. Additionally, the previous public key may be disabled. By disabling the previous public key any software signed by the previous private-public key pair is revoked.

In another example embodiment of the invention the process continues as follows: If the received private key index number is smaller than the current public key index number, execution of the received software package is prevented. If the received private key index number is greater than the current public key index number, the process proceeds to verify authenticity of the received software package using the public key associated with the private key. In an example embodiment of the invention the received private key index number is stored as the current public key index number and thereby the private-public key pair is updated to a new one. In this case the previous public key automatically becomes disabled and any software signed by the previous private-public key pair is revoked.

Figure 4B:
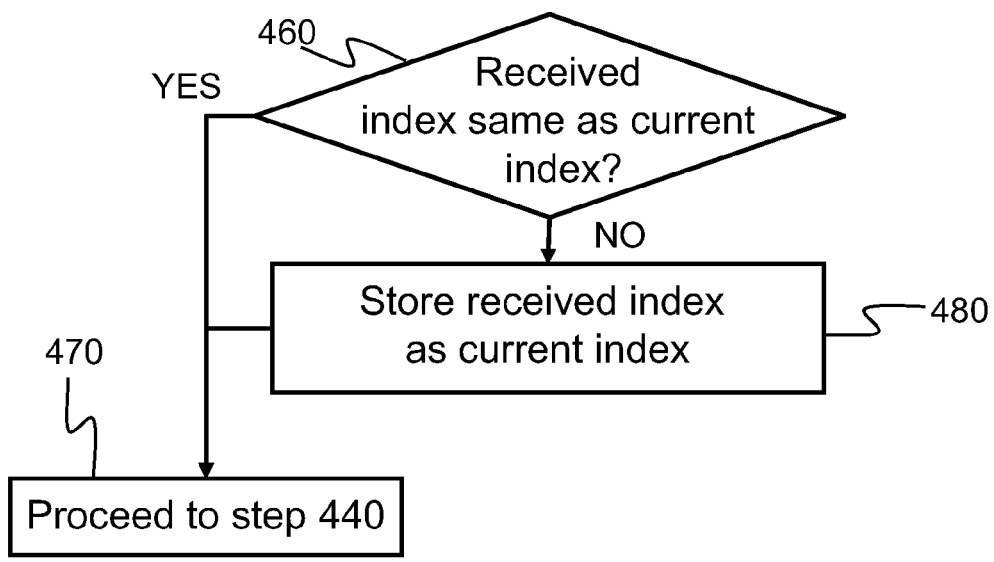
FIG. 4B is a flow diagram illustrating yet another method according to an example embodiment of the invention.

FIG. 4B is a flow diagram illustrating a method according to an example embodiment of the invention. The illustrated method may be part of the method illustrated in FIG. 4A and may be placed for example in the NO branch of the phase 420 of FIG. 4A.

In phase 460, a received private key index number is compared with a current public key index number stored in the device. If the index numbers are the same, the process proceeds to phase 470 and continues from phase 440 of FIG. 4A. In this case it may be concluded that the received software uses the same private-public key pair as before.

If the index numbers are different, the received private key index number is stored as the current public key index number in phase 480, whereby a new private-public key pair is taken into use. As mentioned above this may automatically revoke the previous private-public key pair. Thereafter the process proceeds to phase 470 and continues from phase 440 of FIG. 4A.

Figure 5:
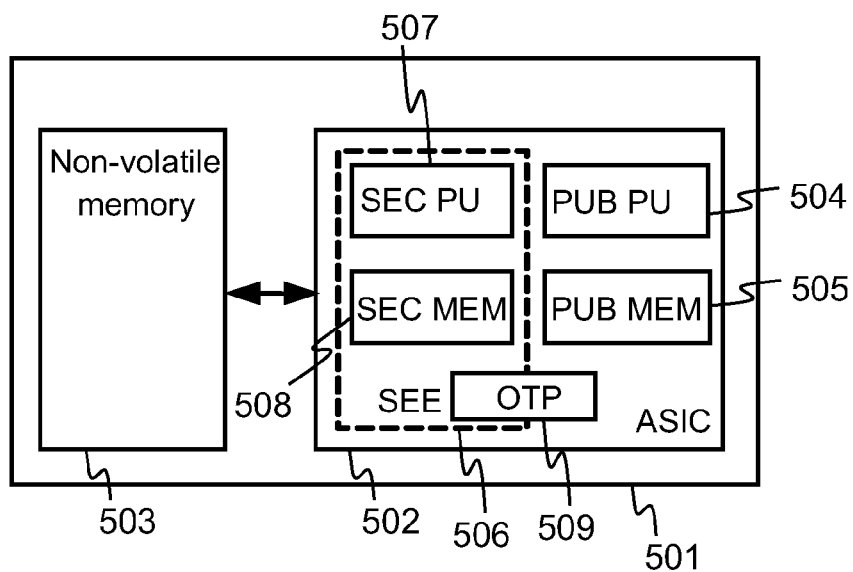
FIG. 5 shows an example device comprising a secure execution environment.

Many electronic devices like mobile phones for example, house a secure execution environment (SEE) for execution of security critical code and for manipulating sensitive content. FIG. 5 shows an example device 501 comprising such secure execution environment. The device 501 comprises a processing hardware 502 and a non-volatile memory 503 (e.g. flash memory). The processing hardware 502 comprises a public processing unit (PUB PU) 504, a public memory for code and data (PUB MEM) 505, and a secure execution environment (SEE) 506. The SEE 506 comprises a secure processing unit (SEC PU) 507, a secure memory for code and data (SEC MEM) 508 and access to a one-time programmable (OTP) memory 509. The SEE 506 is logically and/or physically separated from the rest of the processing environment (PUB PU and PUB MEM) where majority of the software, like the operating system (OS) of the device shall be executed. This makes the SEE 506 a trusted and isolated environment from the operating system that may provide security services and functionality to the whole device 501. One of the services that the SEE 506 may provide is to authenticate that any new software is signed by a trusted source before allowing it to run on the device 501.

Figure 6:
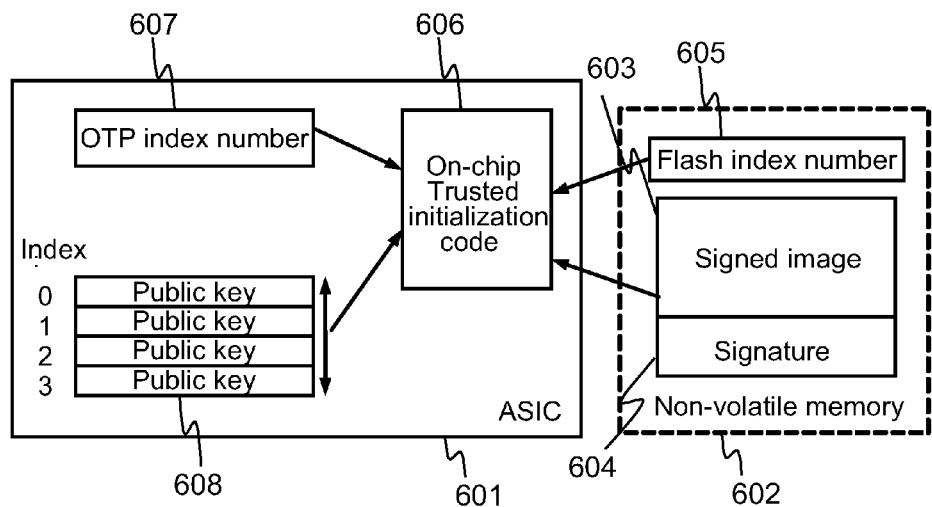
FIG. 6 illustrates key management in an apparatus according to an example embodiment of the invention.

FIG. 6 illustrates key management in an apparatus according to an example embodiment of the invention. The apparatus comprises a processing hardware 601 and a non-volatile memory 602.

The non-volatile memory 602 comprises a signed software image 603 accompanied with a signature 604 and a flash index number 605. The flash index number 605 indicates the index number of the private key that has been used in signing of the software image 603.

The processing hardware 601 comprises a trusted initialization code 606, OTP index number 607 and several public keys with associated index numbers 608 stored in OTP memory. The trusted initialization code 606 is a piece of computer program code running in trusted part of the processing hardware 601 (such as the SEE disclosed in connection with FIG. 5) and configured to authenticate new software. The OTP index number 607 indicates the index number of the public key that is currently in use.

In an example embodiment of the invention the apparatus of FIG. 6 operates as follows:

1. The trusted initialization code 606 reads the flash index number 605.
2. The trusted initialization code 607 reads the OTP index number 607 and compares it to the flash index number 605. If the flash index number 605 is equal to or greater than the OTP index number 607, execution of the software image 603 may be allowed to proceed. If the flash index number 605 is smaller than the OTP index number 607, execution of the software image 603 shall be halted and counter measures will be enforced. The counter measures may be enforced by the SEE.
3. If the execution of the software image 603 may be allowed to proceed, the trusted initialization code 606 takes the correct public key 608 defined by the flash index number 605 from the OTP memory into use.
4. The process proceeds to verify the signature 604 of the signed image 603. This may be done by the trusted initialization code or by some other piece of code. If the image authentication fails, execution of the software image 603 is not allowed and counter measures will be enforced. The counter measures may be enforced by the trusted initialization code or elsewhere in the SEE.
5. If the image authentication is successful, execution of the software image 603 is allowed and/or further security checks may be taken. For example software version numbers may be used in such security checks.

In an example embodiment of the invention the OTP index number 607 serves as a rollback protection for the public key index. The OTP index number 607 defines the minimum index number that shall be accepted by the trusted initialization code. In an example embodiment of the invention the OTP index number 607 is software programmable and updateable only by trusted software (e.g. software running in the SEE). The flash index number 605 may be public information and doesn't need to be protected thanks to the rollback protection provided by the secure OTP index number 607.

Figure 7:
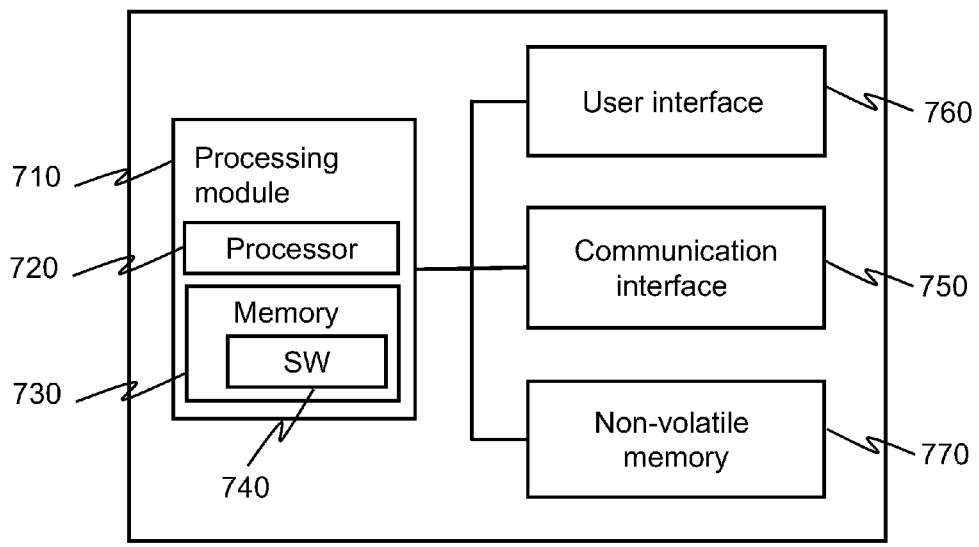
FIG. 7 presents an example block diagram of an apparatus in which various embodiments of the invention may be applied.

FIG. 7 presents an example block diagram of an apparatus 700 in which various embodiments of the invention may be applied. This may be a user equipment (UE), user device or apparatus, such as a mobile terminal or other communication device.

The general structure of the apparatus 700 comprises a communication interface module 750, a processing module 710 coupled to the communication interface module 750, a user interface module 760 coupled to the processing module 710, and a non-volatile memory 770 coupled to the processing module 710. Also the communication interface module 750, the user interface module 760, and the non-volatile memory 770 may communicate with each other. The processing module 710 comprises a processor 720 and a memory 730. The processing module 710 further comprises software 740 stored in the memory 730 and operable to be loaded into and executed in the processor 720. The software 740 may comprise one or more software modules and can be in the form of a computer program product. The processing module 710 may comprise separate processing and memory areas for trusted software or data and for normal operations of the apparatus 700.

The communication interface module 750 may be, e.g., a radio interface module, such as a WLAN, Bluetooth, GSM/GPRS, CDMA, WCDMA, or LTE (long term evolution) radio module. The communication interface module 750 may be integrated into the apparatus 700 or into an adapter, card or the like that may be inserted into a suitable slot or port of the apparatus 700. The communication interface module 750 may support one radio interface technology or a plurality of technologies. FIG. 7 shows one communication interface module 750, but the apparatus 700 may comprise a plurality of communication interface modules 750.

The processor 710 may be, e.g., a central processing unit (CPU), a microprocessor, a digital signal processor (DSP), a graphics processing unit, or the like. FIG. 7 shows one processor 710, but the apparatus 700 may comprise a plurality of processors.

The memory 730 may comprise for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 700 may comprise a plurality of memories. The memory 730 may be constructed as a part of the apparatus 700 or it may be inserted into a slot, port, or the like of the apparatus 700 by a user. The memory 730 may serve the sole purpose of storing data, or it may be constructed as a part of an apparatus serving other purposes, such as processing data or taking security measures. The non-volatile memory 770 may be for example a flash memory and may serve for example the purpose of receiving and storing software updates. The non-volatile memory 770 may be constructed as a part of the apparatus 700 or it may be inserted into a slot, port, or the like of the apparatus 700 by a user.

The user interface module 760 may comprise circuitry for receiving input from a user of the apparatus 700, e.g., via a keyboard, graphical user interface shown on a display of the apparatus 700, speech recognition circuitry, or an accessory device, such as a headset, and for providing output to the user via, e.g., a graphical user interface or a loudspeaker.

A skilled person appreciates that in addition to the elements shown in FIG. 7, the apparatus 700 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 700 may comprise a disposable or rechargeable battery (not shown) for powering the apparatus 700 when external power if external power supply is not available.

Various features of various embodiments of the invention may provide various advantages.

By generating and pre-installing number of public-private key pairs according to various embodiment of the invention one may avoid the burden of changing the whole device when a need arises to change the key pair that is used for software signing and authenticity verification. In this way one may achieve improved flexibility on managing security critical software signing keys of a product.

As new devices are not necessarily needed to be manufactured when signing keys are changed cost, manufacturing and logistic savings may be achieved.

For example digital rights management (DRM) testing requires that old, possibly untrusted software images must not be able to run on a device that contains real DRM keys. This kind of setting may be achieved by programmable public key index according to various embodiments of the invention possibly without any modifications to the device hardware. A large number of devices to be used in research and development phase may thus be manufactured and then used in flexible ways.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus comprising:
   at least one secure memory area comprising a plurality of pre-installed public keys for verifying software authenticity, wherein the plurality of pre-installed public keys have associated public key index numbers, and wherein the secure memory area comprises a current public key index number indicating currently used public key;
   at least one processor; and
   at least one memory including computer program code, the at least one memory and the computer program code being configured to, with the at least one processor, cause the apparatus at least to:
      receive an indication that a software package signed with a private key according to public key infrastructure has been received;
      receive a private key index number associated with the received software package;
      compare the received private key index number and the stored current public key index number;
      if the received private key index number is equal to the current public key index number, proceed to verify authenticity of the received software package using the public key associated with the private key;
      if the received private key index number is different from the current public key index number, to check, whether a public key associated with the received private key index number, is disabled; and
      if the public key associated with the received private key index number is disabled, prevent execution of the received software package, and otherwise, proceed to verify authenticity of the received software package using the public key associated with the private key.

2. The apparatus of claim 1, wherein the apparatus is an electronic communication device.

3. The apparatus of claim 1, wherein the apparatus is an application specific integrated circuit.

4. A method comprising:
   maintaining a secure memory area comprising a plurality of pre-installed public keys for verifying software authenticity, wherein the plurality of pre-installed public keys have associated public key index numbers, and wherein the secure memory area comprises a current public key index number indicating currently used public key;
   receiving an indication that a software package signed with a private key according to public key infrastructure has been received;
   receiving a private key index number associated with the received software package;
   comparing the received private key index number and the stored current public key index number;
   if the received private key index number is equal to the current public key index number, proceeding to verify authenticity of the received software package using the public key associated with the private key;
   if the received private key index number is different from the current public key index number, checking, whether a public key associated with the received private key index number, is disabled; and
   if the public key associated with the received private key index number is disabled, preventing execution of the received software package, and otherwise, proceeding to verify authenticity of the received software package using the public key associated with the private key.

5. The method of claim 4, wherein said secure memory area is an electronic communication device secure memory area.

6. The method of claim 4, wherein said secure memory area is an application specific integrated circuit secure memory area.

7. An apparatus method comprising:
   at least one secure memory area comprising a plurality of pre-installed public keys for verifying software authenticity, wherein the plurality of pre-installed public keys have associated public key index numbers, and wherein the secure memory area comprises a current public key index number indicating currently used public key;
   at least one processor; and
   at least one memory including computer program code, the at least one memory and the computer program code being configured to, with the at least one processor, cause the apparatus at least to:
      receive an indication that a software package signed with a private key according to public key infrastructure has been received;
      receive a private key index number associated with the received software package;
      compare the received private key index number and the stored current public key index number;
      if the received private key index number is equal to the current public key index number, proceed to verify authenticity of the received software package using the public key associated with the private key;
      if the received private key index number is smaller than the current public key index number, prevent execution of the received software package, and
      if the received private key index number is greater than the current public key index number, proceed to verify authenticity of the received software package using the public key associated with the private key.

8. The apparatus of claim 7, wherein the apparatus is an electronic communication device.

9. The apparatus of claim 7, wherein the at least one memory and the computer program code configured to, with the at least one processor, cause the apparatus to further perform:
   store the received private key index number as the current public key index number, if the received private key index number is greater than the current public key index number.

10. The apparatus of claim 7, wherein the apparatus is an application specific integrated circuit.

11. A computer program embodied on a computer readable medium comprising computer executable program code which, when executed by at least one processor of an apparatus, which comprises at least one secure memory area comprising a plurality of pre-installed public keys for verifying software authenticity wherein the plurality of pre-installed public keys have associated public key index numbers and wherein the secure memory area comprises a current public key index number indicating currently used public key, causes the apparatus to:

receive an indication that a software package signed with a private key according to public key infrastructure has been received;

receive a private key index number associated with the received software package;

compare the received private key index number and the stored current public key index number;

if the received private key index number is equal to the current public key index number, proceed to verify authenticity of the received software package using the public key associated with the private key;

if the received private key index number is different from the current public key index number, to check, whether a public key associated with the received private key index number, is disabled; and if the public key associated with the received private key index number is disabled, prevent execution of the received software package, and otherwise, proceed to verify authenticity of the received software package using the public key associated with the private key.

12. The computer program embodied on the computer readable medium of claim 11, wherein the apparatus is an electronic communication device.

13. The computer program embodied on the computer readable medium of claim 11, wherein the apparatus is an application specific integrated circuit.

* * * * *